United States Patent

Cuypers et al.

Patent Number: 5,288,179
Date of Patent: Feb. 22, 1994

[54] HOB FOR GENERATING FACE GEARS

[75] Inventors: Martinus H. Cuypers, Eindhoven, Netherlands; Jan M. Seroo, Bocholt, Belgium

[73] Assignee: Crown Gear B.V., Netherlands

[21] Appl. No.: 844,589

[22] PCT Filed: Sep. 28, 1990

[86] PCT No.: PCT/NL90/00141
§ 371 Date: Mar. 27, 1992
§ 102(e) Date: Mar. 27, 1992

[87] PCT Pub. No.: WO91/04819
PCT Pub. Date: Apr. 18, 1991

[30] Foreign Application Priority Data
Sep. 28, 1989 [NL] Netherlands .......... 8902417

[51] Int. Cl.$^5$ .............................. B26D 1/14
[52] U.S. Cl. ......................... 407/23; 407/20
[58] Field of Search .......... 407/20, 23, 25, 26, 407/27, 28, 29

[56] References Cited

U.S. PATENT DOCUMENTS

| | | | |
|---|---|---|---|
| 2,456,842 | 12/1948 | Rutbell | 407/20 |
| 2,706,848 | 4/1955 | Riley | 407/25 |
| 3,740,808 | 6/1973 | Shioya | 407/25 |

Primary Examiner—Bruce M. Kisliuk
Assistant Examiner—Bryan Reichenbach
Attorney, Agent, or Firm—Ostrolenk, Faber, Gerb & Soffen

[57] ABSTRACT

A cutter for producing face gears, comprising a disc-shaped cutter body with cutting teeth (23) fitted on the periphery. The cutting edge (24) of each cutting tooth lies in a surface of revolution which is produced by turning an imaginary gear wheel of infinitely low thickness about the axis (20) of the cutter and simultaneously about its own axis. Each cutting tooth (23) of the cutter is of such a shape that the cutting tooth is re-grindable, without the shape of the cutting edge of the cutting tooth changing as a result. This is achieved through the fact that the profile of each cutting tooth shifts in planes (22, 22a, 22b...) from the cutting edge (24) of the cutting tooth to the rear side thereof in the direction of the axis (20) of the cutter.

4 Claims, 6 Drawing Sheets

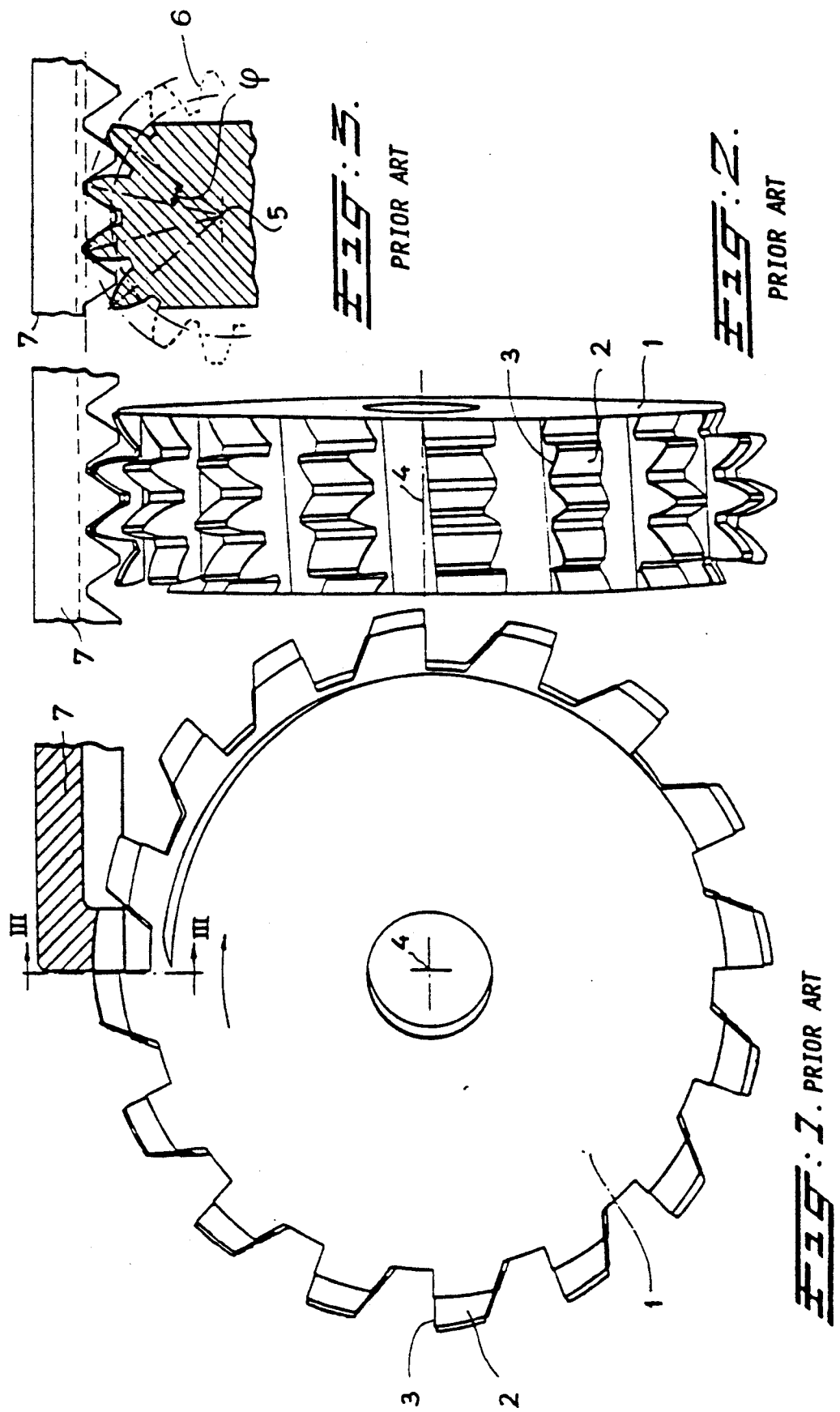

FIG: 6.

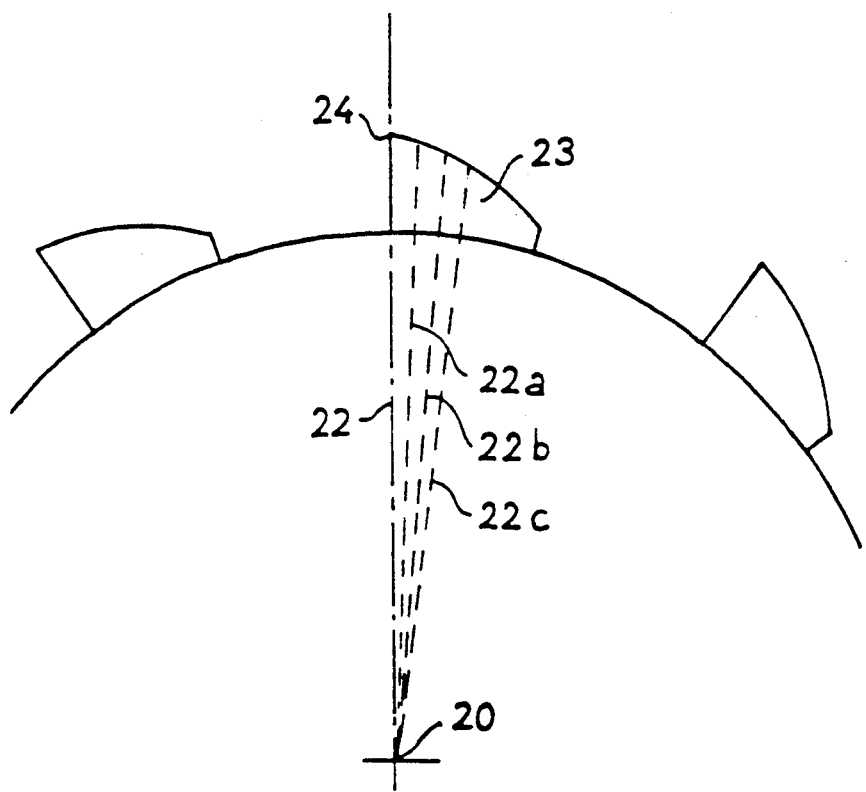
FIG: 8a.

HOB FOR GENERATING FACE GEARS

BACKGROUND OF THE INVENTION

The invention relates to a cutter for producing face gears, in particular a hob.

Face gears are gears which are used in angle drives with axes which may or may not intersect each other and may or may not form an angle of 90 degrees with each other. In this drive a cylindrical pinion meshes with a face gear whose teeth shape corresponds to the teeth shape of the cylindrical pinion.

The angle drive with face gear gearing has a number of special advantages compared with the generally known and used bevel gear drive, such as, inter alia, the absence of axial forces on the cylindrical pinion when it is designed with spur teeth, a greater transmission ratio being possible, the relatively simple adjustment, and a great transverse contact ratio which can be achieved without special facilities.

The absence of an economically feasible, and in addition accurate, manufacturing method was, however, hitherto one of the greatest problems for general use of the face gear gearing in highly loaded constructions. The absence of suitable manufacturing equipment played a major role in this.

The use of generating tools, by means of which face gears can be produced in a continuous process, is in practice a condition for the economic production of face gears and for a wider use of face gears in highly loaded and/or fast-running constructions.

A hobbing cutter for producing face gears is known from U.S. Pat. No. 2,304,586 (Miller). This cutter is a disc-shaped cutter body with cutting teeth provided on the periphery. The cutting edges of these cutting teeth are situated in a surface of revolution which is produced by turning an imaginary gear wheel of infinitely low thickness about the axis of the cutter body and simultaneously about its own axis, during which the imaginary gear wheel on one revolution about the axis of the cutter body turns about its own axis through an angle which is equal to a whole number of times the pitch angle of the imaginary gear wheel, and the plane of the imaginary gear wheel always extends in the radial direction of the cutter body and at right angles to the path described by the teeth of the imaginary gear wheel.

The cutting teeth are provided with clearance faces in the same way as ordinary cutting teeth of a cutter.

The known cutter has, however, the disadvantage that during the re-grinding of the cutting teeth the shape of the cutting edge of the cutting teeth changes, so that the shape of the face gear teeth formed with the re-ground cutter will also change. This is undesirable.

SUMMARY OF THE INVENTION

The object of the invention is to provide a hobbing cutter for producing face gears which can be re-ground without the shape of the cutting edge of the cutting teeth changing.

This object is achieved by a cutter for producing face gears of the known type in which each cutting tooth of the cutter forms an integral part of the cutter body, and is of such a shape that the profile of the cutting tooth in radial planes going through the axis of the cutter is always the same. The profile of the cutting tooth in these planes shifting from the cutting edge of the cutting tooth to the rear side thereof in the direction of the axis of the cutter.

The object of the invention is also achieved by a cutter for producing face gears of the known type, in which each cutting tooth of the cutter is formed by a separate cutting blade which is fixed on the periphery on the cutter body and is of such a shape that the profile of the cutting tooth in planes running parallel to each other and parallel to the axis of the cutter is always the same. The profile of the cutting tooth in these planes shifts from the cutting edge of the cutting tooth to the rear side thereof in the direction of the axis of the cutter.

The cutter according to the invention can be re-ground without the shape of the cutting edge of the cutting teeth changing. This makes it possible with a re-ground cutter to produce face gears with exactly the same tooth shape as before re-grinding.

BRIEF DESCRIPTION OF THE DRAWINGS

The invention will now be explained in greater detail below with reference to the example of an embodiment shown in the drawings in which:

FIG. 1 is an end view of a known cutter, during the production of a face gear, which is partially shown;

FIG. 2 is a side view of the known cutter, viewed from the left side in FIG. 1;

FIG. 3 is a radial section of the known cutter along the line III—III in FIG. 1;

FIG. 8a shows a part of a cutter with integral cutting teeth in side view;

DETAILED DESCRIPTION OF THE PREFERRED EMBODIMENTS

Figures 4, 5:
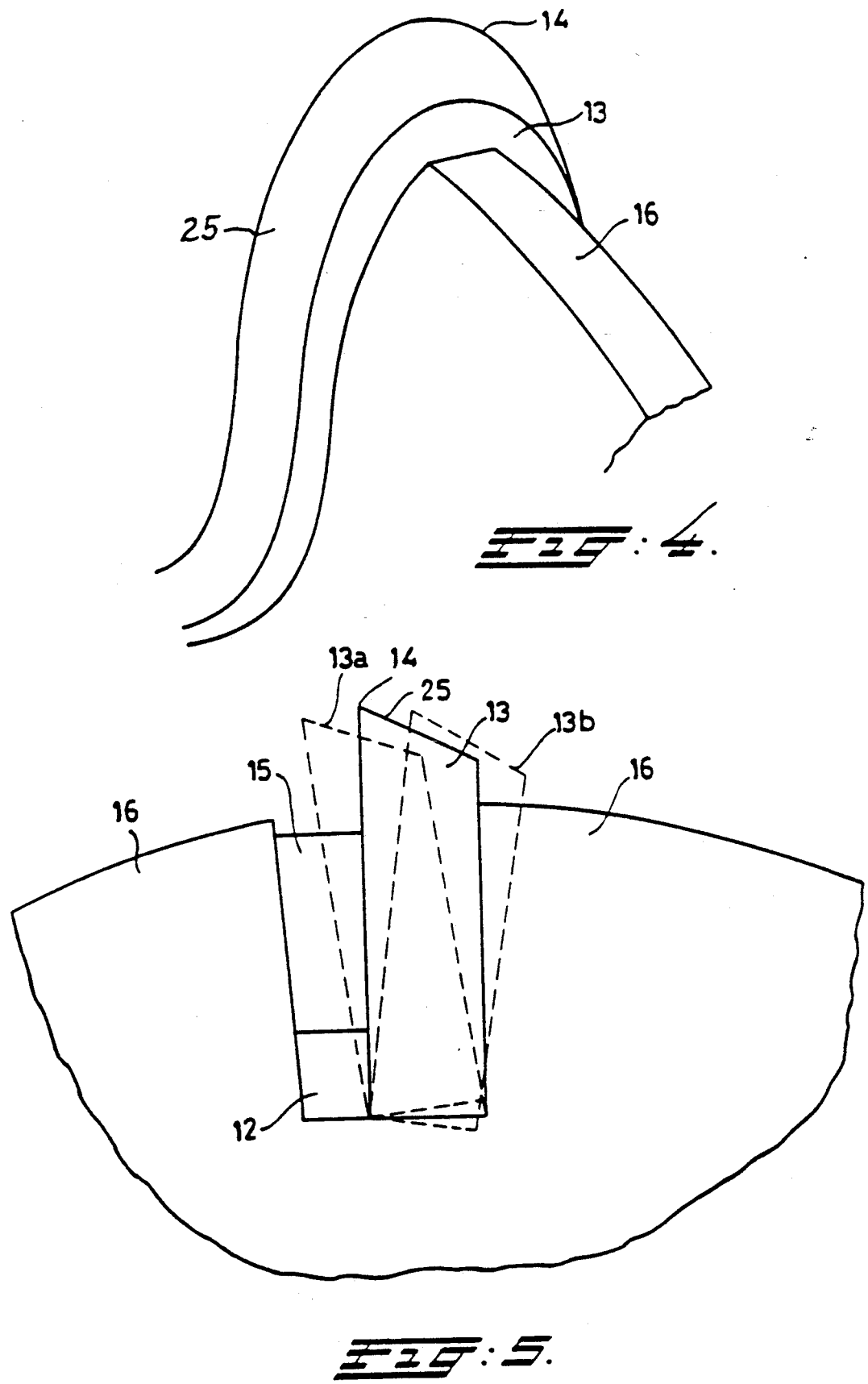
FIGS. 4 and 5 show a part of a cutting blade of a cutter according to the invention, in perspective and in cross section, respectively.

FIGS. 1-3 show a known hobbing cutter for producing face gears. This known cutter is described in detail in U.S. Pat. No. 2,304,586 (Miller), referred herein.

The cutter comprises a disc-shaped cutter body 1, with cutting teeth 2 provided on the periphery. The cutting edges 3 of these cutting teeth are situated in a surface of revolution which is produced by turning an imaginary gear wheel 6 of infinitely low thickness about the axis 4 of the cutter body and simultaneously about its own axis 5, during which the imaginary gear wheel on one revolution about the axis turns through an angle which is equal to a whole number of times the pitch angle 6 of the imaginary gear wheel, and the plane of the imaginary gear wheel always extends in the radial direction of the cutter body and at right angles to the path described by the teeth of the imaginary gear wheel. The shape of the imaginary gear wheel 6 corresponds essentially to the shape of the pinion which is to mate with the face gear 7 to be produced.

The cutting teeth 2 of the cutter are provided with clearance faces in the same way as conventional cutting teeth of a cutter.

The cutter according to the invention differs from the known cutter through the shape of the cutting teeth.

Figure 6:
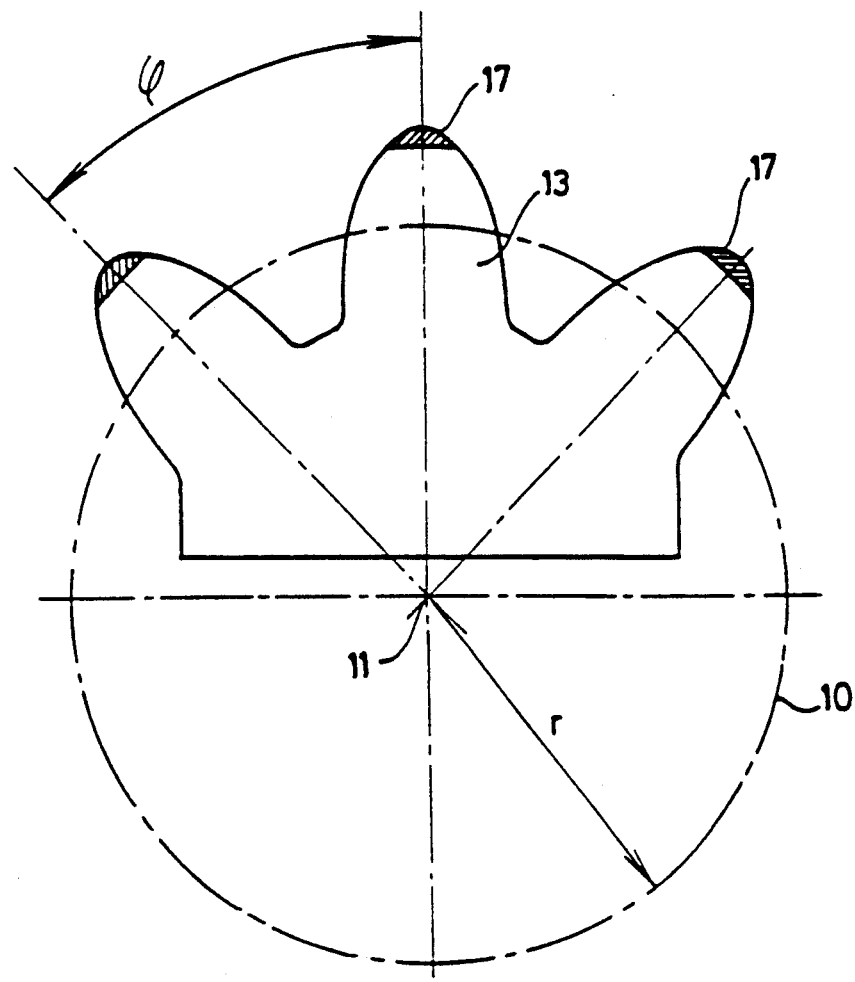
FIG. 6 shows the profile of the cutting edge of a cutting blade.

FIGS. 4 and 5 show a first embodiment of apart of a cutting tooth of a cutter according to the invention. Each cutting tooth is formed by a separate cutting blade 13 fixed on the periphery of the cutter body. The cutting blades have a cutting edge 14, which lies in the earlier mentioned surface of revolution formed by the imaginary gear wheel. This means that cutting edge 14, viewed in the cutting direction, is of a shape which corresponds essentially to the shape of the profile of a segment of the cylindrical pinion which has to mate with the face gear. In FIG. 6, in which a cutting blade 13 is shown in front view, the shape of the cutting edge of the cutting blade can be seen clearly.

The cutting blades 13 can be fixed by means of fixing pieces 15 in the usual manner in transverse slits 12 in ribs 16 provided on the periphery of the cutter body. The cutting blades 13 are supported at the rear side by the ribs 16.

The teeth of the cutting blades 13 are expediently provided at the top side with a top rounded part 17 (see FIG. 6) for forming the bottom of the tooth space between the teeth of the face gear to be produced.

Figure 7:
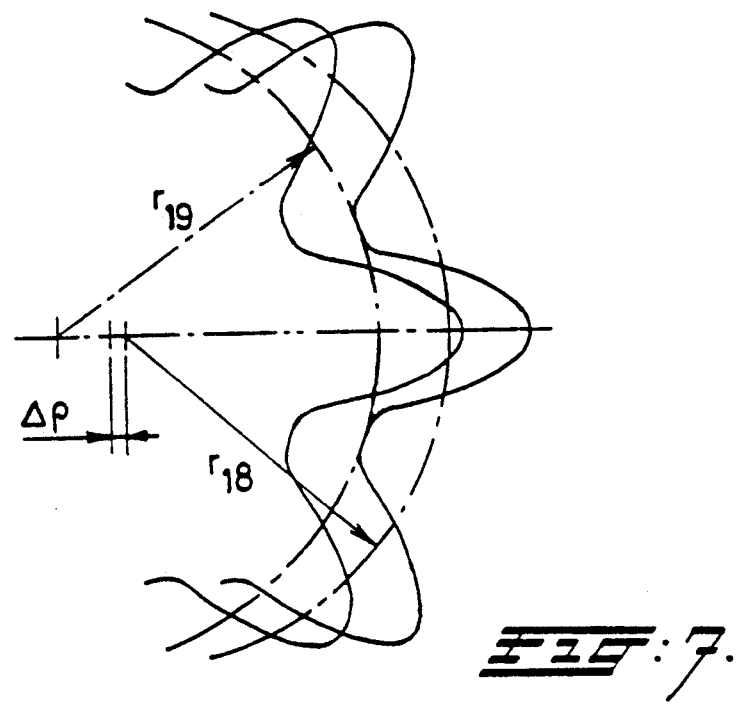
FIGS. 7 and 8 show a tooth of a re-grindable cutting blade for a tool according to the invention, in axial and in side views.
Figure 8:
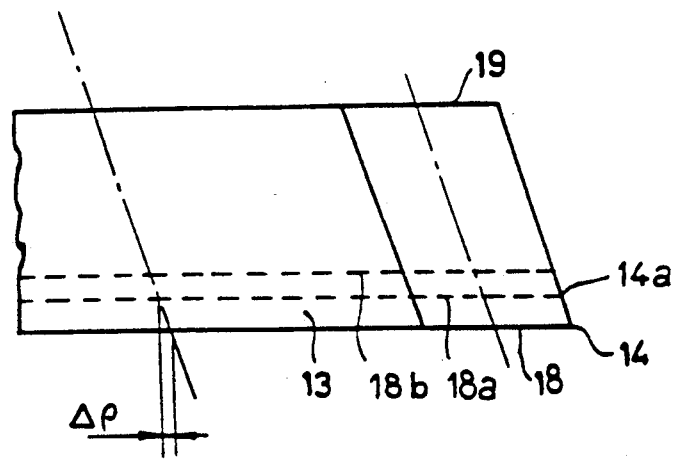

The cutting blades 13 can if necessary lie slanting in the peripheral direction, in order to obtain better run-in conditions when the cutting edges are running into the material of the face gear. FIG. 5 shows by dotted lines two possible slanting positions of the cutting blades, namely "forward", indicated by 13a, and "backward", indicated by 13b. The cutting blades 13 are fitted detachably in the slits 12 and can be re-ground. In order to ensure that the cutting blades 13 always have the same tooth shape again after re-grinding, they are designed in such a way (see FIGS. 7 and 8) that from the front side 18 of the cutting blades 13 to the rear side 19 the profile of the blades shifts parallel in the direction of the axis of rotation of the cutter. If a cutting blade 13 is re-ground at the front side 18, the same profile of the cutting edge 14a is produced again in face 18a, although slightly shifted in the direction of the axis of rotation of the cutter. In FIG. 7 $r_{18}$ shows the radius of the pitch circle of the gear wheel segment profile at the front side 18 of the cutting blade, while $r_{19}$ indicates the radius of the pitch circle at the rear side 19 of the cutting blade 13. The radius $r_{18}$ is equal to the radius $r_{19}$. After re-grinding of the cutting blades 13, the distance between the axis of rotation of the cutter and the face gear to be produced must be re-adjusted, in order to ensure that the position of the cutting edge 14 of the cutting blades 13 relative to the face gear to be produced is equal again to that before the re-grinding.

In another embodiment of the cutter according to the invention, each cutting tooth of the cutter forms an integral part of the cutter body, as in the case of the known cutter. The shape of each cutting tooth is in this case, however, such (see FIG. 8a) that the profile of the cutting tooth 23 in radial planes 22, 22a, 22b ... going through the axis 20 of the cutter is always the same, the profile of the cutting tooth in these planes shifting from the front side, thus the cutting edge 24 of the cutting tooth, to the rear side thereof in the direction of the axis 20 of the cutter.

These teeth 23 are also re-grindable, in which case the shape of the cutting edge is the same again after re-grinding, although the cutting edge is slightly shifted in the direction of the axis of rotation 20 of the cutter. In this embodiment of the cutter also, the distance between the axis of rotation of the cutter and the face gear to be produced must be adjusted after the re-grinding, since the diameter of the cutter has become smaller.

Figure 9:
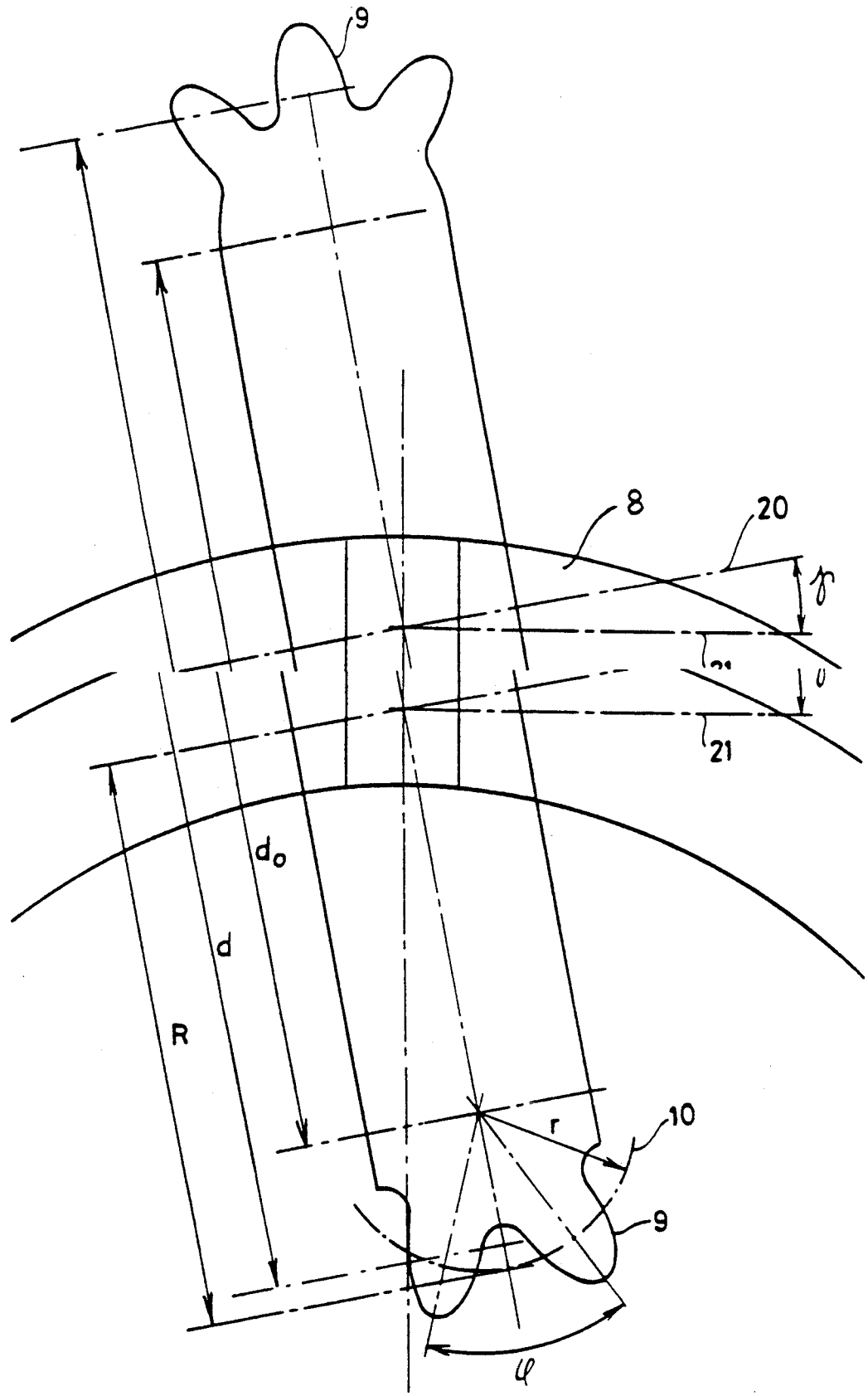
FIG. 9 shows the position of a cutter according to the invention relative to the face gear to be produced.

During the use of a hobbing cutter for the production of a face gear, the cutter must be positioned in such a way relative to the workpiece that the direction of movement of the cutting teeth on the disc at the place where they engage in the workpiece corresponds to the required direction of the teeth of the face gear 8 to be produced. This is indicated in FIG. 9. in FIG. 9 $\gamma$ indicates the angle between the axis of rotation 20 of the cutter and a line 21 at right angles to the required direction of the toothing of the face gear 8 to be produced.

The angle $\gamma$ is determined by the following relation $$tg\gamma = n \cdot y \cdot r \cdot 2\pi R \text{ or } tg\gamma = m \cdot n \cdot 2R \tag{1}$$

in which:

$r$ = radius of the pitch circle 10 of the gear wheel segment profile 9, $\phi$ = pitch angle of the gear wheel segment profile 9, $n$ = number of times that the gear wheel segment profile 9 makes an angular displacement equal to the pitch angle $\phi$ about the centre point 11 of the pitch circle during one revolution of the cutter, $R$ = distance between the axis of rotation 20 of the tool and the point of the pitch circle 10 of the gear wheel segment profile 9 furthest away from it, and $m$ = module of the teeth of the gear wheel segment profile.

If $n=1$, then the tool can be called "single-thread". If $n>1$, then the tool can be called "multiple-thread".

During the re-grinding the centre point 11 of the gear wheel segment profile 9 shifts over a distance $\Delta p$. In the case of loose cutting blades this can be compensated for by fitting filling elements below the cutting blades. If this shift is not, or is only partially, compensated for, as in the case of cutters with integral teeth, then the angle $\gamma$ must be adapted, since R has changed.

The cutting teeth of the cutter according to the invention are provided with clearance faces 25. The clearance faces 25 need to be present only in a working area of the cutter for which d, the diameter of a cylinder with the axis 20 of the cutter as axis, is greater than a specific bottom limit value. This can be derived from what follows (see also FIG. 9).

The teeth of the face gear 8 have a pressure angle $\alpha i$ which is determined by the radius $R_i$ from the axis of the face gear, where:

$$\cos \alpha i = \frac{i \cdot d_1}{2 R_i} \text{ or } \frac{m \cdot z_2}{2 R_i} \tag{2}$$

in which:

$i$ = transmission ratio = $z_2/z_1$ $z_2$ = number of teeth of the face gear $z_1$ = number of teeth of the pinion meshing with the face gear $d_1$ = pitch circle diameter of the pinion $m$ = module of the teeth of face gear and pinion.

$R_i$ has a minimum value to which a minimum pressure angle $\alpha i$ belongs, $\alpha i$ is, for example, always greater than 5°.

Now:

$$d = d_o + \frac{mz_1 \cos \alpha n}{\cos \alpha i} \tag{3}$$

in which:
$\alpha n$ = normal pressure angle of the pinion
$d_o$ = diameter of the circle on which the centre points 11 of the pitch circles of the gear wheel segment profiles lie.

If the minimum value of $\alpha i$ is substituted in formula (3), the bottom limit value of d follows from this.

The cutter needs to work only in an area in which d is greater than the minimum value, thus for which $\alpha i$ is greater than the minimum value which is determined by the minimum value of Ri.

With the re-grindable cutters according to the invention face gears can be produced continuously, accurately and economically, due to the fact that the service life of the cutters is considerably longer than that of the known cutter, without this being at the expense of the accuracy of the face gear produced.

We claim:

1. Cutter for producing face gears, comprising:
a disc-shaped cutter body with a periphery, a central axis and cutting teeth fitted on the periphery, each cutting tooth having a front and rear side and a cutting edge which lies in a surface of revolution which is produced by turning an imaginary gear wheel of infinitely low thickness about the central axis of the cutter body and simultaneously about an axis of said imaginary gear wheel, during which the imaginary gear wheel on turning one revolution about the central axis of the cutter body turns about said axis of said imaginary gear wheel through an angle which is equal to a whole number of times the pitch angle of the imaginary gear wheel, and a plane defined by the imaginary gear wheel always extends in the radial direction of the cutter body and at a right angle to a path described by the teeth of the imaginary gear wheel, and each cutting tooth of the cutter forming an integral part of the cutter body and having a shape defined by a plurality of profiles, each profile lying in a respective one of a plurality of radial planes extending through the central axis of the cutter body, each of the radial planes extending radially through the central axis of the cutter body and through the cutting tooth always being of a same shape, while each profile of the cutting tooth in successive radial planes, as seen from the front side of the cutting tooth to the rear side thereof, shifts toward the central axis of the cutter body.

2. Cutter for producing face gears, comprising:
a disc-shaped cutter body with a periphery, a central axis and cutting teeth fitted on the periphery, each cutting tooth having a front and rear side and a cutting edge which lies in a surface of revolution which is produced by turning an imaginary gear wheel of infinitely low thickness about the central axis of the cutter body and simultaneously about an axis of said imaginary gear wheel, during which the imaginary gear wheel on turning one revolution about the central axis of the cutter body turns about said axis of said imaginary gear wheel through an angle which is equal to a whole number of times the pitch angle of the imaginary gear wheel, and a plane defined by the imaginary gear wheel always extends in the radial direction of the cutter body and at a right angle to a path described by the teeth of the imaginary gear wheel, each cutting tooth of the cutter being formed by a separate cutting blade which is fixed on the periphery of the cutting body and each separate cutting blade having a shape defined by a plurality of profiles, each profile lying in a respective one of a plurality of successive parallel planes, each of the planes extending parallel to the central axis of the cutter body and running parallel to the front side of the cutting blade, each of the planes of the cutting blade always being of a same shape, while each profile of the cutting blade in successive parallel planes, as seen from the front side of the cutting blade to the rear side thereof, shifts towards the central axis of the cutter body.

3. Cutter body according to claim 1, characterized in that each cutter tooth is provided with clearance faces in at least those areas to which the following applies:

$$d > d_o + \frac{mz_1 \cos \alpha n}{\cos (\alpha i) \min}$$

in which:
d = diameter of a cylinder with the axis of the cutter as central axis,
$d_o$ = diameter of the circle on which the center points of the pitch circles of tooth profiles of the cutter body lie,
m = module of the teeth of the face gear to be produced,
$z_1$ = number of teeth of the pinion which is to mesh with the face gear,
$\alpha n$ = normal pressure angle of the pinion,
$(\alpha i)$ min = minimum pressure angle of the face gear.

4. Cutter according to claim 2, characterized in that each cutting blade is provided with clearance faces in at least those areas to which the following applies:

$$d > d_o + \frac{mz_1 \cos \alpha n}{\cos (\alpha i) \min}$$

in which:
d = diameter of a cylinder with the axis of the cutter as central axis,
$d_o$ = diameter of the circle on which the centre points of the pitch circles of tooth profiles of the cutter lie,
m = module of the teeth of the face gear to be produced,
$z_1$ = number of teeth of the pinion which is to mesh with the face gear,
$\alpha n$ = normal pressure angle of the pinion,
$(\alpha i)$ min = minimum pressure angle of the face gear.

* * * * *